(12) United States Patent
Wall et al.

(10) Patent No.: US 8,595,616 B2
(45) Date of Patent: Nov. 26, 2013

(54) DATA CONVERSION ENVIRONMENT

(75) Inventors: Phil Wall, Charlotte, NC (US); Scott Matthew Dix, Stanley, NC (US)

(73) Assignee: Bank of America Corporation, Charlotte, NC (US)

( * ) Notice: Subject to any disclaimer, the term of this patent is extended or adjusted under 35 U.S.C. 154(b) by 1378 days.

(21) Appl. No.: 11/755,906

(22) Filed: May 31, 2007

(65) Prior Publication Data

US 2008/0301162 A1 Dec. 4, 2008

(51) Int. Cl.
*G06F 17/00* (2006.01)

(52) U.S. Cl.
USPC .......................................... 715/249; 715/239

(58) Field of Classification Search
USPC ......................................... 715/236, 239, 249
See application file for complete search history.

(56) References Cited

U.S. PATENT DOCUMENTS

| | | | |
|---|---|---|---|
| 6,381,600 B1 * | 4/2002 | Lau .................................. | 707/6 |
| 6,823,495 B1 * | 11/2004 | Vedula et al. ................ | 715/805 |
| 6,853,997 B2 * | 2/2005 | Wotring et al. .............. | 707/100 |
| 7,149,742 B1 * | 12/2006 | Eastham et al. ...................... | 1/1 |
| 7,269,582 B2 * | 9/2007 | Winter et al. ........................ | 1/1 |
| 7,607,120 B2 * | 10/2009 | Sanyal et al. ................. | 717/106 |
| 2005/0010896 A1 * | 1/2005 | Meliksetian et al. ......... | 717/106 |
| 2005/0154628 A1 | 7/2005 | Eckart et al. | |

FOREIGN PATENT DOCUMENTS

| | | |
|---|---|---|
| WO | 03019415 | 3/2003 |
| WO | 03046757 | 6/2003 |

OTHER PUBLICATIONS

International Search Report and Written Opinion for International Application No. PCT/US2008/065244, mailed Sep. 1, 2008, 11 pages.

Silvana Castano, et al, "Global Viewing of Heterogeneous Data Sources", IEEE Transactions on Knowledge and Data Engineering, vol. 13, No. 2, Mar. 2001-Apr. 2001, pp. 277-297, XP002492467, Italy. Retrieved from the Internet at <http://ieeexplore.ieee.org/iel5/69/19821-00917566.pdf?> on Aug. 18, 2008.

International Preliminary Report on Patentability for International Application No. PCT/US2008/065244, mailed Dec. 10, 2009, 8 pages.

* cited by examiner

*Primary Examiner* — Manglesh M Patel
(74) *Attorney, Agent, or Firm* — Banner & Witcoff, Ltd.; Michael A. Springs

(57) ABSTRACT

Converting data from a first format to a second format may be used to merge two databases having different formatting. Conversion maps may be defined for pairs of formats and may be used to convert data between the pair of formats. Data may further be transformed from one information type or format into another information type or format. In one example, a first format may allow storage of a social security number while a second format might not. Thus, a social security number stored in the first format may be converted to an employee number for storage in the second format. Collisions between pieces of data may be detected and managed by generating an identifier for the pieces of data (e.g., data records) and merging the pieces of data into a single piece or portion of data (e.g., a single data record) corresponding to the assigned identifier.

16 Claims, 7 Drawing Sheets

DATA CONVERSION ENVIRONMENT

BACKGROUND

Electronic storage of data has become prevalent in many aspects of life. From personal information to business data, information is often stored in electronic form to facilitate retrieval and access. For example, personal and/or business calendars are often stored in a person's cellular telephone or mobile device so that they may easily access the information wherever they go. However, the merging of data may present difficulties as data is commonly stored in different formats depending on the type or brand of the system on which the data is stored. Thus, data must be converted from one format to another to harmonize the two sets of information. In many systems, conversion of data is customized for a particular situation and thus, cannot be re-used in future instances. This increases the cost of data conversion as each instance of data conversion from one format to another format is addressed individually even when conversion has been performed in the past for the same pair of data formats.

SUMMARY

This summary is provided to introduce a selection of concepts in a simplified form that are further described below in the Detailed Description. The Summary is not intended to identify key features or essential features of the claimed subject matter, nor is it intended to be used to limit the scope of the claimed subject matter.

Conversion maps may be defined for pairs of formats and may be re-usable in any instance where data needs to be converted from a first format to a second format. A conversion system and/or method may initially receive the data to be converted and determine a source format associated with the data. Further, a destination format to which the data is to be converted may also be identified. Once the source and destination formats have been determined, a conversion map may be selected from a database of conversion maps based on the determined source and destination formats. By applying the conversion map, the data may be converted from the source format to the destination format without manual intervention or analysis. Conversion maps may include rules for mapping data from a first field of a source format to a second field of a destination format. Conversion maps may further include transformation rules for converting data from a first information type or format to a second information type or format. For example, a date may be converted from an "mm/dd/yyyy" format to a "dd/mm/yyyy" format. In another example, marital status may be converted from a numerical value to a word (e.g., "single" or "married" or "divorced").

According to one or more aspects, a conversion system may detect collisions in data. Collisions in data may relate to multiple data entries each having a different identifier for a single entity. In such instances, the multiple data entries each having a different identifier may be reconciled prior to merging the information into the destination database. As such, a conversion system may assign a new identifier (different from the identifiers used in the multiple data entries) to the entity and merge the data using the new identifier.

BRIEF DESCRIPTION OF THE DRAWINGS

The foregoing summary of the invention, as well as the following detailed description of illustrative embodiments, is better understood when read in conjunction with the accompanying drawings, which are included by way of example, and not by way of limitation with regard to the claimed invention.

DETAILED DESCRIPTION

In the following description of various illustrative embodiments, reference is made to the accompanying drawings, which form a part hereof, and in which is shown, by way of illustration, various embodiments in which the invention may be practiced. It is to be understood that other embodiments may be utilized and structural and functional modifications may be made without departing from the scope of the present invention.

Figure 1:
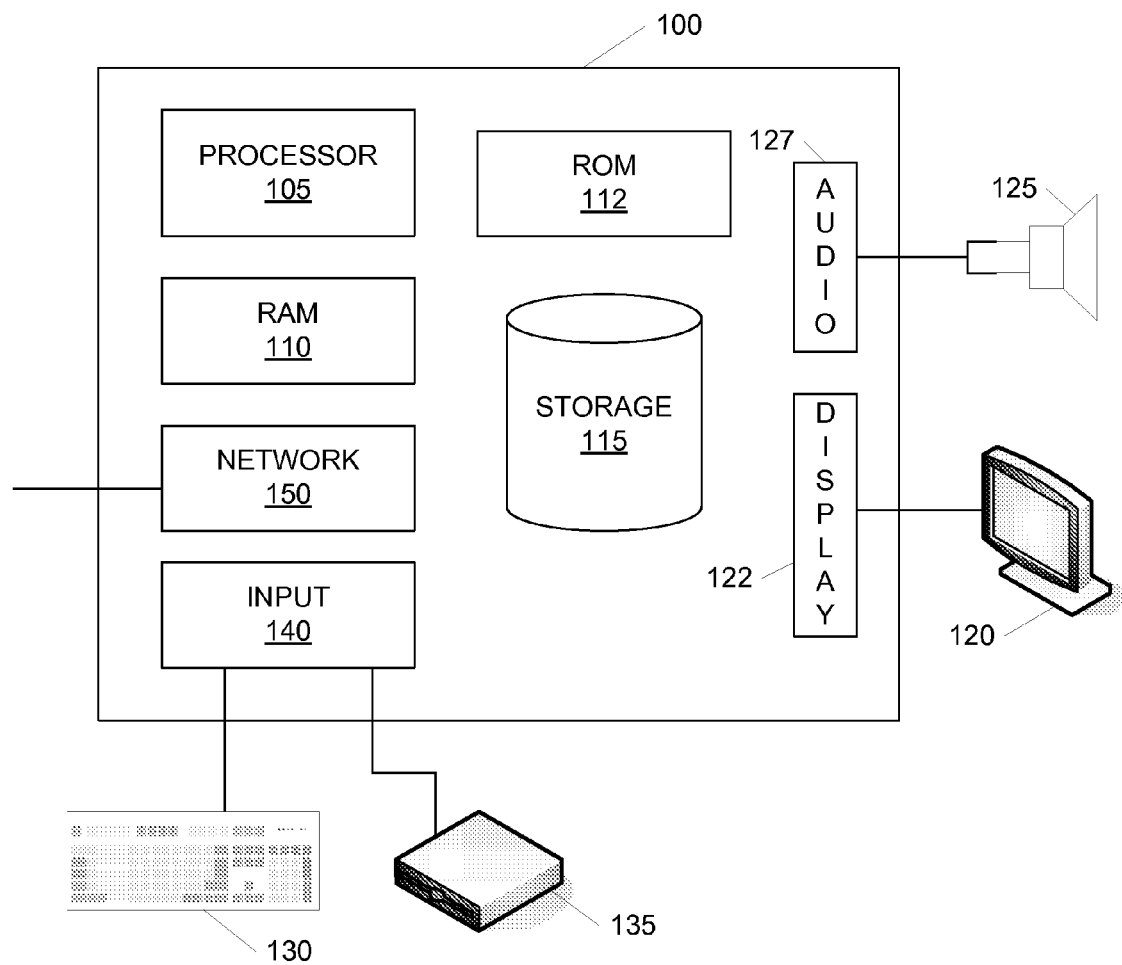
FIG. 1 illustrates a computing environment in which one or more aspects described herein may be implemented.

FIG. 1 illustrates a computing environment in which one or more aspects described herein may be implemented. A computing device such as computer 100 may house a variety of components for inputting, outputting, storing and processing data. For example, processor 105 may perform a variety of tasks including executing one or more applications, retrieving data from a storage device such as storage 115 and/or outputting data to a device such as display 120. Processor 105 may be connected to Random Access Memory (RAM) module 110 in which application data and/or instructions may be temporarily stored. RAM module 110 may be stored and accessed in any order, providing equal accessibility to the storage locations in RAM module 110. Computer 100 may further include Read Only Memory (ROM) 112 which allows data stored thereon to persist or survive after computer 100 has been turned off. ROM 112 may be used for a variety of purposes including for storage of computer 100's Basic Input/Output System (BIOS). ROM 112 may further store date and time information so that the information persists even through shut downs and reboots. In addition, storage 115 may provide long term storage for a variety of data including applications and data files. Storage 115 may include any of a variety of computer readable mediums such as disc drives, optical storage mediums, magnetic tape storage systems, flash memory and the like. In one example, processor 105 may retrieve an application from storage 115 and temporarily store the instructions associated with the application RAM module 110 while the application is executing.

Computer 100 may output data through a variety of components and devices. As mentioned above, one such output device may be display 120. Another output device may include an audio output device such as speaker 125. Each output device 120 and 125 may be associated with an output adapter such as display adapter 122 and audio adapter 127, which translates processor instructions into corresponding audio and video signals. In addition to output systems, computer 100 may receive and/or accept input from a variety of input devices such as keyboard 130, storage media drive 135 and/or microphone (not shown). As with output devices 120 and 125, each of the input devices 130 and 135 may be associated with an adapter 140 for converting the input into computer readable/recognizable data. In one example, voice input received through microphone (not shown) may be converted into a digital format and stored in a data file. In one or more instances, a device such as media drive 135 may act as both an input and output device allowing users to both write and read data to and from the storage media (e.g., DVD-R, CD-RW, and the like).

Computer 100 may further include one or more communication components for receiving and transmitting data over a network. Various types of networks include cellular networks, digital broadcast networks, Internet Protocol (IP) networks and the like. Computer 100 may include adapters suited to communicate through one or more of these networks. In particular, computer 100 may include network adapter 150 for communication with one or more other computer or computing devices over an IP network. In one example, adapter 150 may facilitate transmission of data such as electronic mail messages and/or financial data over a company or organization's network. In another example, adapter 150 may facilitate transmission or receipt of information from a world wide network such as the Internet. Adapter 150 may include one or more sets of instructions relating to one or more networking protocols. For example adapter 150 may include a first set of instructions for processing IP network packets as well as a second set of instructions associated with processing cellular network packets. In one or more arrangements, network adapter 150 may provide wireless network access for computer 100.

One of skill in the art will appreciate that computing devices such as computer 100 may include a variety of other components and is not limited to the devices and systems described in FIG. 1.

Figure 2:
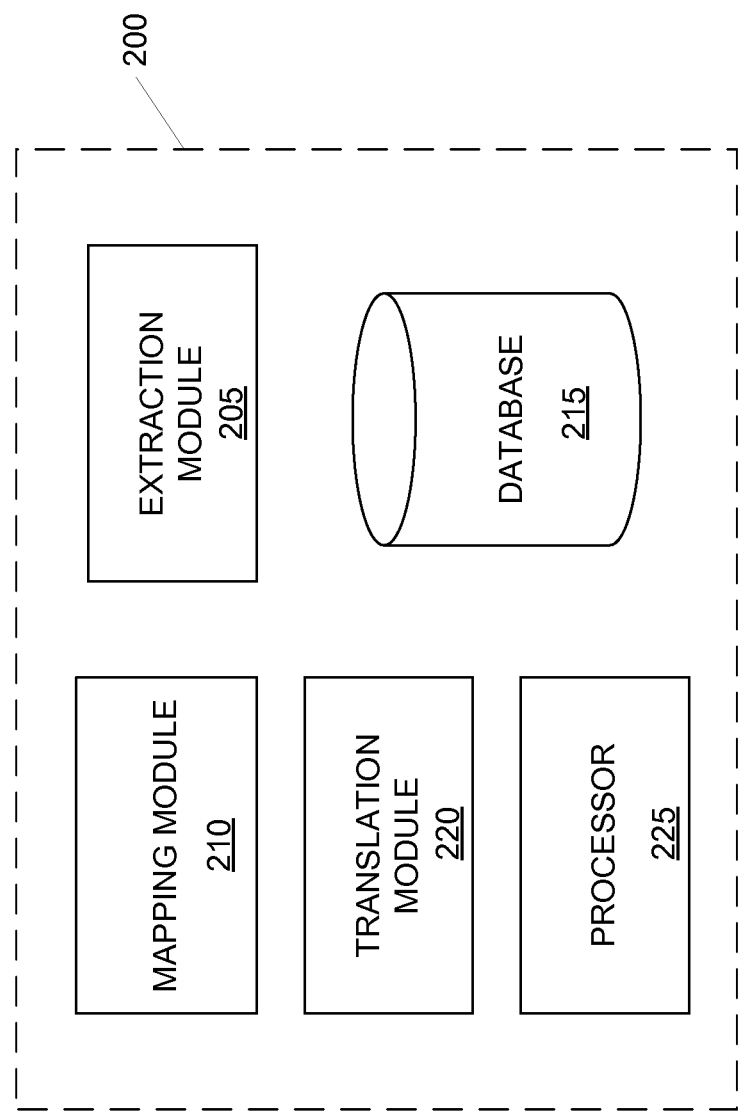
FIG. 2 illustrates a block diagram of a system for converting data from a first format to a second format according to one or more aspects described herein.

FIG. 2 illustrates a system for converting data from a first format to a second format. Format, as used herein, generally relates to a structure or manner in which data is stored. Thus, in one example, a first data record may be formatted differently than a second data record if the two records include different fields and/or parameters. System 200 may include a variety of components such as extraction module 205, mapping module 210, database 215, translation module 220 and processor 225. Processor 225 may be used to process information and execute various types of instructions from one or more of modules 205, 210, 215 and/or 220. Alternatively or additionally, each of modules 205, 210, 215 and 220 may include their own processors. One of skill in the art will appreciate that one or more of modules 205, 210, 215 and/or 220 may be combined into a single module or component. For example, mapping module 210 and translation module 220 may be combined into a single conversion module according to one or more arrangements.

Extraction module 205 is configured to retrieve and/or receive data to be converted from one or more sources including external or internal databases. In one example, two companies or organizations may merge and thus, require merging of their databases. Accordingly, extraction module 205 may extract data from a database of the first organization for conversion into a format suitable for a database of the second organization. The data may relate to a variety of information including human resources records, memoranda, e-mails, draft documents and the like. Extraction module 205 may further be configured to parse the data as it is being extracted from a source. That is, extraction module 205 may identify types of information, data fields and/or data records based on predefined parsing rules (e.g., fields are delineated using a ";" or records indicated by a "$"). In one or more arrangements, extraction module 205 may use rules that are customized according to the data source's storage and formatting convention. Extraction module 205 may further include security parameters that allow for secure transmission of information from the information source to system 200. Extracted data may be temporarily or permanently stored in database 215.

Mapping module 210 and translation module 220 may work in conjunction to convert extracted data into a suitable format for a destination database or system. Mapping module 210 may be configured to map extracted data from a first format to a second format. In some instances, the first format may include different fields than the second format. As such, mapping module 210 may be responsible for mapping data stored in the fields of the first format to corresponding fields of the second format. For example, data stored in a "Last Name" field of the first format may be mapped to a "Family Name" field of the second format. In another example, information in a dependent field of a first format may be parsed and stored in "Children" and "Spouse" fields of the second format. The mapping rules may be stored in database 215. Translation module 220, on the other hand, may be used to transform a first data type to a second data type. For example, a first format may include social security numbers while a second format might only allow for employee identification numbers. In such cases, the translation module 220 may transform the social security numbers into a corresponding employee identification number. The transformation may be performed based on predefined translation rules or tables stored in database 215. In another example, a person's gender may be represented by a numerical value (e.g., 1 for male, 2 for female) in accordance with a first format of a source database while gender is represented by "male" and "female" based on a second format of a destination database. To harmonize the databases, the translation module 220 may identify a gender rule that specifies gender values of 1 are to be translated into the word "male" while gender values of 2 are to be translated into the word "female," and convert the data accordingly.

The above modules may be implemented in hardware, software, firmware or a combination thereof. Further, one of ordinary skill will appreciate that a variety of other components may also be included in system 200 depending on the preferences and/or needs of the user.

Figure 3:
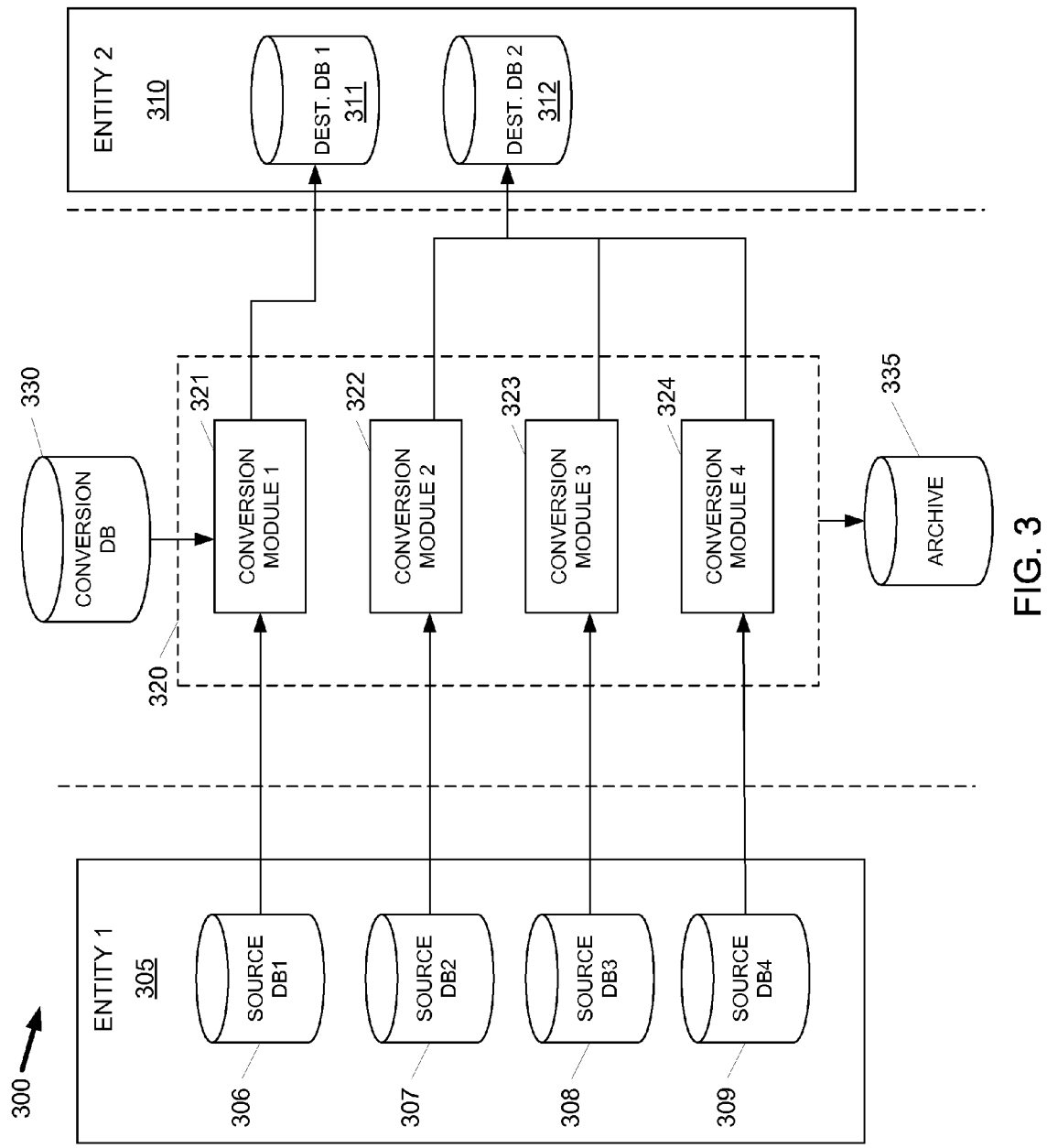
FIG. 3 illustrates an environment in which one or more aspects described herein may be implemented.

FIG. 3 illustrates a system environment in which the conversion methods and system described herein may be used. System environment 300 may generally include a first entity, e.g., source entity 305 that is seeking to combine its databases with that of a second entity, e.g., destination entity 310. Source entity 305 may include four source databases (i.e., databases 306, 307, 308 and 309) that it wishes to merge with destination databases 311 and 312 of destination entity 310. Conversion system 320 (e.g., system 200 of FIG. 2) may facilitate the merging process by converting and translating data from one or more first formats used by databases 306, 307, 308 and 309 of source entity 305 to one or more second formats used by databases 311 and 312 of destination entity 310. Conversion system 320 may include multiple conversion modules or applications such as modules 321, 322, 323 and 324 for handling each of the format conversions associated with databases 306, 307, 308 and 309, respectively. A fewer number of conversion modules or applications may be used if two or more databases of databases 306, 307, 308 and 309 use the same format. For example, if databases 308 and 309 both use a the same data format, the number of conversion modules may be reduced to three (e.g., module 323 may handle conversion for both databases 308 and 309).

In one or more configurations, conversion modules 321, 322, 323 and 324 may feed into different destination databases depending on the type of data being converted by those modules. For example, data converted by each of modules 322, 323 and 324 may feed into destination database 312 while the data converted by module 321 may feed into destination database 311. Further, conversion system 320 may be connected to or include conversion database 330 and archive 335. Conversion database 330 may be used to store rules and tables for converting various types of data and format. In one example, conversion database 330 may provide a table that maps social security numbers to a corresponding employee ID number or code. Archive 335, on the other hand, may be configured to store the source data prior to conversion.

According to one or more aspects, data from source databases 306, 307, 308 and 309 may be exported to system 320 using one or more export tools. Once exported, conversion system 320 may then convert the data into a format (e.g., a data record format) required by entity 310 and databases 311 and 312.

Figure 4:
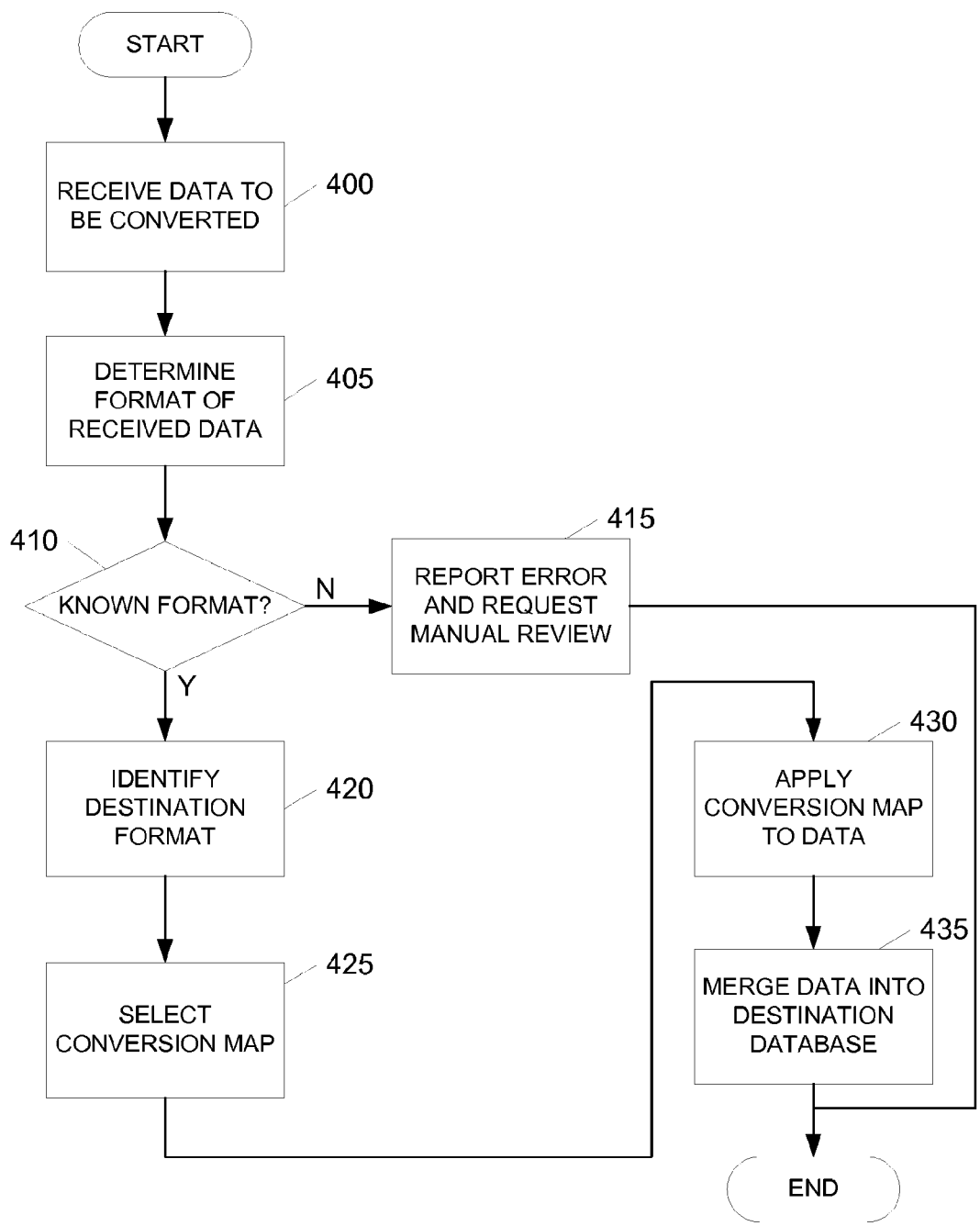
FIG. 4 is a flowchart illustrating a method for converting data from a first format to a second format according to one or more aspects described herein.

FIG. 4 is a flowchart illustrating a method for converting data from a first format to a second format. In step 400, a conversion system may receive data to be converted from one or more sources. In one or more instances, the data to be converted may be exported from an external database and sent to the conversion system. Data may be exported in various manners including through the use of a migration tool. In step 405, the conversion system may determine the current format of the data to be converted. Such a determination may be made by comparing the current format with known formatting schemes or structures. The conversion system may store information regarding formatting schemes in a knowledge base and use such information for format identification purposes. In one example, a data format may be identified based on whether the data is formatted into data records, the fields associated with a data record, the sizes of each field, the number of records allowed, the number of fields allowed, data types (e.g., numbers, characters, words, phrases) allowed for each field and the like. In step 410, the conversion system may determine whether the format is a known format. If it is not, the conversion system may report an error and request manual review of the data in step 415.

If, however, the format is a known format, the conversion system may identify a destination format in step 420. That is, the conversion system may identify a format to which the data is to be converted. The destination format may be specified by the database or system to which the data is to be sent or merged. In one example, two merging companies may wish to combine their human resources records. As such, if the first company's records are in a first format, they would need to be converted to the second company's record format or vice versa. In step 425, the conversion system may select a conversion map from a database of conversion maps based on the source format and/or the destination format. Conversion maps specify rules and definitions for converting data from one format to another. In various instances, data may be formatted into records containing predefined fields. For example, a human resources database may include a record for each employee of the company or organization. Each employee record may include various information fields such as name, age, dependents, address, phone number and the like. Accordingly, conversion maps may include tables that map data record fields of a first format to data record fields of a second format. A conversion map may be created for various pairs of formats. Once a conversion map is identified, the map may be applied to the data in step 430.

Figure 5:
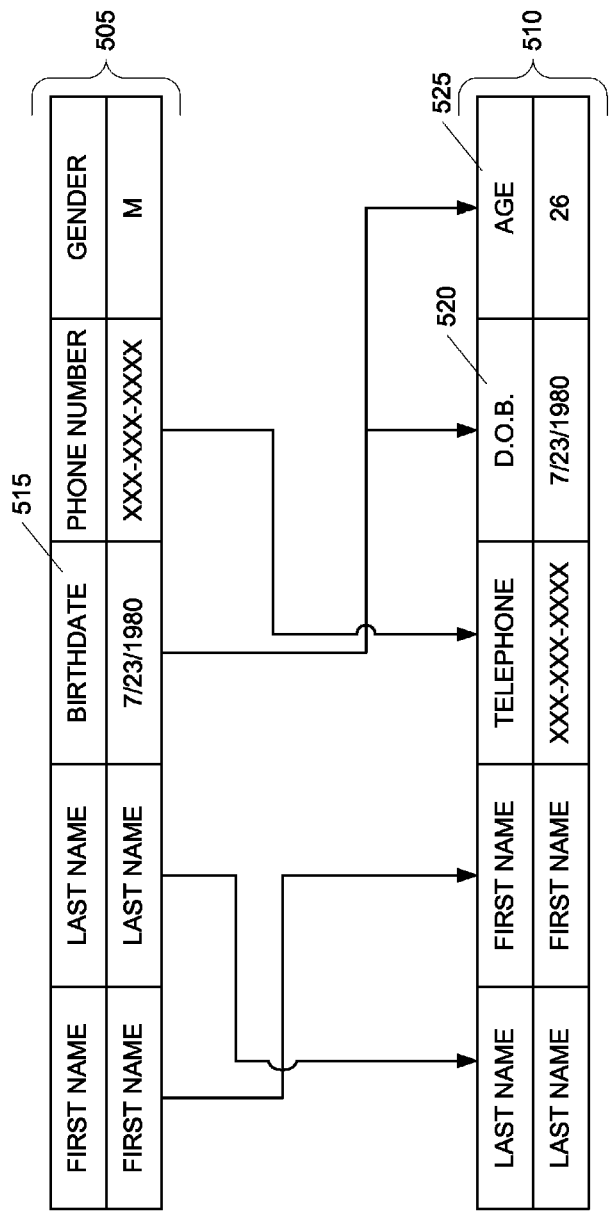
FIG. 5 illustrates a mapping process for converting data from a first format to a second format according to one or more aspects described herein.

Application of the conversion map may include various processes including a mapping procedure comprising the identification of correspondences between fields in the source format and fields in the destination format and copying data between the corresponding fields. FIG. 5 illustrates a first data record format 505, a second data record format 510 and identification of field correspondences between the two formats. For example, "Birthdate" field 515 of format 505 may correspond to "D.O.B." field 520 of format 510. As such, data in field 515 may be copied over to field 520. In one or more instances, a field of format 510 might not correspond to a field of format 505 (or vice versa). In such cases, a conversion system may leave the field empty, disregard the field or it may determine the appropriate value or data to complete the field. For example, if format 510 includes an "Age" field such as field 525, the conversion system may automatically calculate an age based on the data stored in "Birthdate" field 515 of format 505.

Referring again to FIG. 4, a conversion map may, alternatively or additionally, specify rules and definitions for translating or transforming data from a first information type or format to a second information type or format. By way of example, a first data format may specify marital status using single letters, e.g., "M" corresponds to married, "S" corresponds to single and "D" corresponds to divorced. However, a second data format might define marital status using numerical representations (e.g., 1=married, 2=single, 3=divorced). As such, a transformation or translation of the alphabetical character to corresponding number may be performed during the conversion process. Correspondence tables may also be used to aid translation and conversion of data from one format to another. In one example, a person's social security number may be converted into an employee ID number using a table that stores correspondences between the two numbers. The destination format might not use social security numbers due to safety and security concerns. Once converted, the data may be merged with the database of the destination system in step 435. Conversion maps may be used and re-used so that customized mappings or conversion programming does not need to be developed each time data is to be merged.

Figure 6:
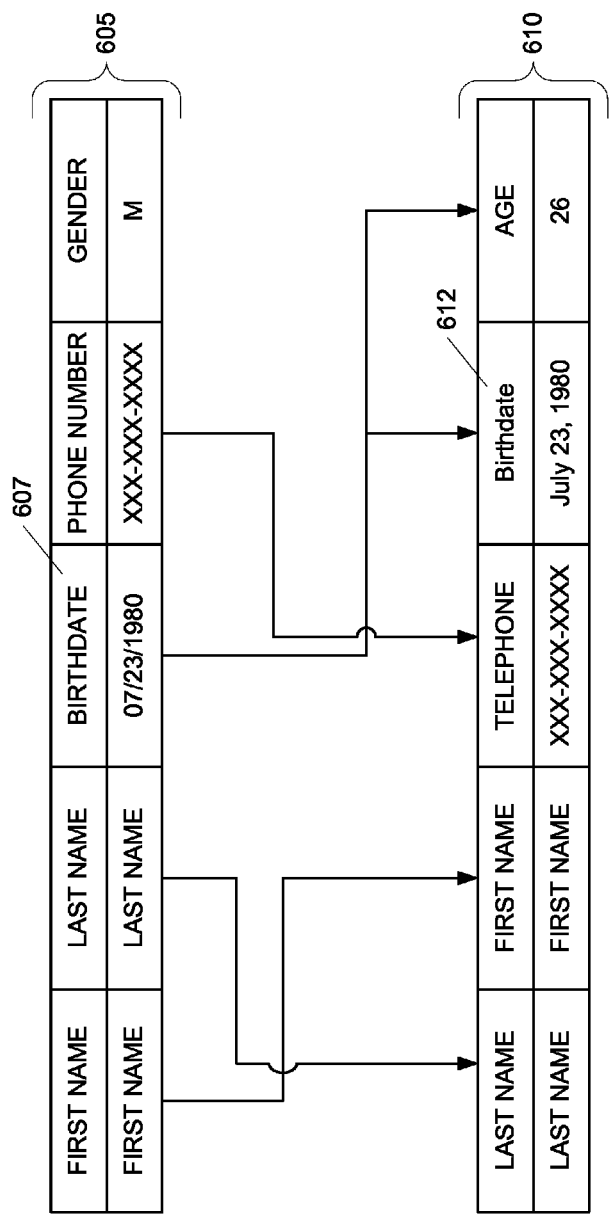
FIG. 6 illustrates a translation process for converting data from a first format to a second format according to one or more aspects described herein.

FIG. 6 illustrates a translation process between first record format 605 and second record format 610. As illustrated, first record format 605 stores birthdates in an "mm/dd/yyyy" format (e.g., "Jul. 23, 1980" in field 607) where "mm" corresponds to a two digit representation of the month, "dd" represents the day and "yyyy" corresponds to a four digit year. However, second record format 610 may store birthdates differently using the name of the month, the day and the year (e.g., "Jul. 23, 1980" in field 612). Accordingly, a conversion system may translate the two digit month of the birthdate stored in format 605 into the name of the month such that the date is formatted in accordance with second record format 610. One of ordinary skill in the art will appreciate that many types of information may be represented in a variety of formats.

Figure 7:
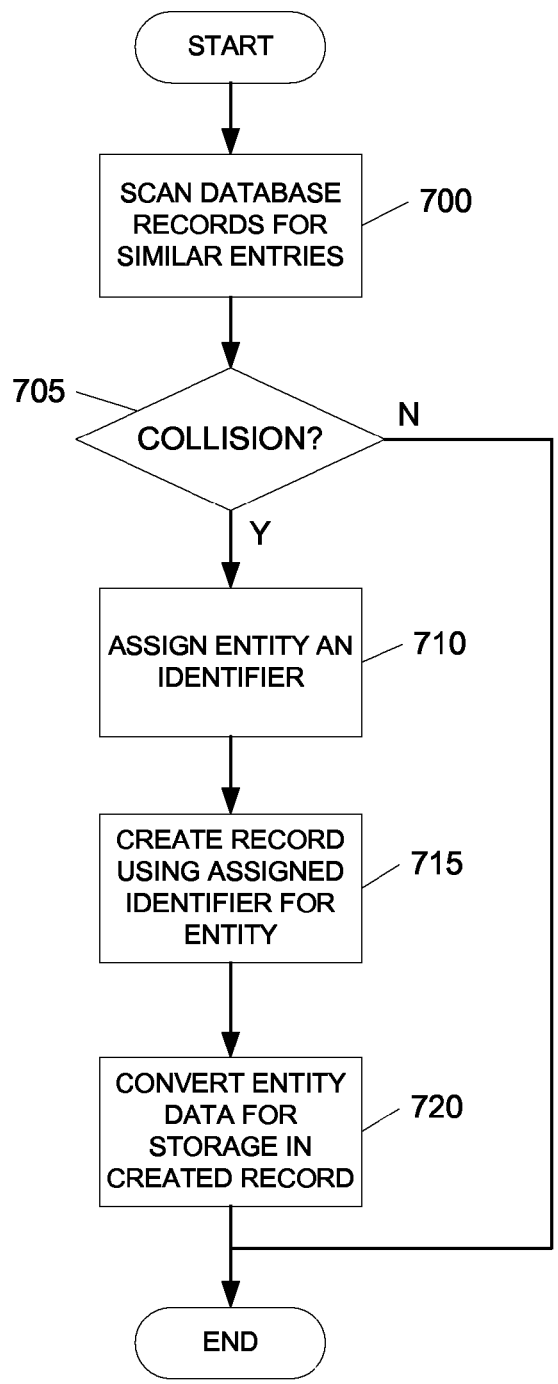
FIG. 7 is a flowchart illustrating a method for collision management according to one or more aspects described herein.

According to one or more aspects, a conversion system may perform collision detection in instances where an entity is represented multiple times in a database with different identifiers (e.g., there are multiple records for the same person in a human resources database, where each record using a different identification number). FIG. 7 illustrates a method for resolving collisions during data conversion. In step 700, the conversion system may scan the database records for similar entries. For example, the conversion system may compare name fields between records in the database to determine whether more than one entry exists for a given individual. Other attributes of an entity may also be compared as further verification that the records correspond to the same entity. In step 705, the conversion system may determine whether a collision has been detected. If a collision is detected, the conversion system may assign that entity an identifier in step 710. The identifier may be a randomly assigned identification number, an alphanumeric ID or the like. In one or more arrangements, the assigned identifier may be different from the identifiers used in the multiple data entries or records. Once assigned, the conversion system may create a data record in the destination database in accordance with the destination format and using the assigned identifier in step 715. Thereafter, the conversion system may convert the source data in each of the multiple records to the second format for storage in the data record of the destination database in step 720. In one or more arrangements, the conversion system may further store an association between one or more identifiers used in the source data records with the corresponding assigned identifier used in the destination data record. This may provide for the location of a data record or entity using the previous or old identifiers during a transition period.

Additionally, the methods and features recited herein may further be implemented through any number of computer readable media that are able to store computer readable instructions. Examples of computer readable media that may be used include RAM, ROM, EEPROM, flash memory or other memory technology, CD-ROM, DVD or other optical disk storage, magnetic cassettes, magnetic tape, magnetic storage and the like.

While illustrative systems and methods as described herein embodying various aspects are shown, it will be understood by those skilled in the art that the invention is not limited to these embodiments. Modifications may be made by those skilled in the art, particularly in light of the foregoing teachings. For example, each of the elements of the aforementioned embodiments may be utilized alone or in combination or subcombination with elements of the other embodiments. It will also be appreciated and understood that modifications may be made without departing from the true spirit and scope of the present invention. The description is thus to be regarded as illustrative instead of restrictive on the present invention.

We claim:

1. A method for converting data comprising:
   receiving at a processor, first data to be converted, said data comprising a plurality of records;
   identifying a first data format of the first data;
   identifying a second data format into which the received first data is to be converted;
   selecting a first conversion map from a plurality of predefined conversion maps based on the identified first data format and the identified second data format;
   converting each record of the received first data from the first data format to the second data format by applying the selected conversion map to the received first data, wherein the converting includes converting a numeric value into at least one of: a corresponding word and a corresponding phrase;
   detecting a collision between a first record and a second record of the received data, wherein the collision is detected when the first record and the second record both correspond to a first entity; and
   in response to detecting the collision:
      assigning the first and second records a same identifier; and
      converting the first and second records into the second format using the assigned identifier.

2. The method of claim 1, wherein the first conversion map includes a mapping from a first field of the first format to a second field of the second format.

3. The method of claim 1, wherein converting the received data from the first format to the second format includes transforming at least a portion of the received data from a first information type to a second information type.

4. The method of claim 3, wherein the first information type includes a social security number and the second information type includes an identifier other than the social security number.

5. The method of claim 1, wherein the first format corresponds to a first application and the second format corresponds to a second application different from the first application.

6. The method of claim 1, wherein the receiving the first data to be converted includes extracting the data to be converted from an external database.

7. The method of claim 1, wherein converting the received data from the first format to the second format includes parsing the received data based on one or more predefined fields of the second format.

8. The method of claim 1, further comprising:
   receiving second data to be converted, wherein the additional data is in a third format; and
   converting the second data from the third format to a fourth format using a second conversion map different from the first conversion map.

9. An apparatus comprising:
   a processor; and
   a memory configured to store computer readable instructions that, when executed by the processor, cause the processor to perform:
   mapping first data, said first data comprising a plurality of records, from a first format to a second format based on one or more predefined mapping rules;
   transforming the first data from the first format into the second format based on one or more predefined translation rules, wherein the one or more predefined translation rules includes a rule for transforming a numeric value into at least one of: a corresponding word and a corresponding phrase;
   detecting a collision between a first record and a second record in the first format, wherein the collision is detected when the first record and the second record both correspond to a first entity; and
   in response to the detecting the collision:
      assigning the first and second records a same identifier based on one or more collision resolution rules; and
      converting the first and second records into the second format using the assigned identifier.

10. The apparatus of claim 9, wherein the processor is further configured to map second data in a third format into a fourth format based on one or more additional predefined mapping rules.

11. The apparatus of claim 9, wherein the first data in the first format corresponds to a date stored in the first format.

12. A non-transitory computer readable medium storing computer readable instructions that, when executed, cause a processor to perform a method comprising:
   receiving first data to be converted, said data comprising a plurality of records;
   identifying a first data format of the first data;

identifying a second data format into which the received first data is to be converted;

selecting a first conversion map from a plurality of predefined conversion maps based on the identified first data format and the identified second data format;

converting each record of the received first data from the first data format to the second data format by applying the selected conversion map to the received first data, wherein the converting includes converting a numeric value into at least one of: a corresponding word and a corresponding phrase; and detecting a collision between a first record and a second record of the received data, wherein the collision is detected when the first record and the second record both correspond to a first entity; and in response to detecting the collision:
   assigning the first and second records a same identifier; and
   converting the first and second records into the second format using the assigned identifier.

13. The non-transitory computer readable medium of claim 12, wherein the first conversion map includes a mapping from a first field of the first format to a second field of the second format.

14. The non-transitory computer readable medium of claim 12, wherein converting the received data from the first format to the second format includes transforming at least a portion of the received data from a first information type to a second information type.

15. The non-transitory computer readable medium of claim 14, wherein the first information type includes a social security number and the second information type includes an identifier other than the social security number.

16. The non-transitory computer readable medium of claim 12, wherein the first format corresponds to a first application and the second format corresponds to a second application different from the first application.

* * * * *